United States Patent [19]

Judge

[11] Patent Number: 4,901,950
[45] Date of Patent: Feb. 20, 1990

[54] AIRCRAFT FUSELAGE

[76] Inventor: Richard J. Judge, 1241 SE. 13th Ter., Fort Lauderdale, Fla. 33316

[21] Appl. No.: 242,500

[22] Filed: Sep. 12, 1988

Related U.S. Application Data

[63] Continuation-in-part of Ser. No. 948,197, Dec. 31, 1986, abandoned.

[51] Int. Cl.$^4$ .............................................. B64C 1/00
[52] U.S. Cl. ...................................... 244/119; 244/87
[58] Field of Search ............... 244/119, 87, 55, 120, 244/65, 130, 13

[56] References Cited

U.S. PATENT DOCUMENTS

| D. 150,434 | 8/1948 | Lovejoy et al. | 244/13 |
|---|---|---|---|
| 2,424,889 | 7/1947 | Holmes | 244/87 |
| 3,188,025 | 6/1965 | Moorehead | 244/55 |
| 3,191,888 | 6/1965 | Sklenka | 244/55 |
| 3,455,523 | 7/1969 | Hertel | 244/55 |

Primary Examiner—Joseph F. Peters, Jr.
Assistant Examiner—Rodney Corl
Attorney, Agent, or Firm—Melvin K. Silverman

[57] ABSTRACT

A single aft located prop aircraft having an X-axis in alignment with the line of thrust of the aircraft; a Y-axis transverse to the X-axis, the Y-axis being in parallel with the length of a single main wing; and a Z-axis transverse to the plane defined by the X and Y-axes. The fuselage exhibits Y-axis symmetry about the thrust line and, in addition, substantial X-axis symmetry about a line defined by the forward edge of the main wing. The fuselage assembly includes a substantially conical cone, the cone having its root at the beginning of the pilot's cabin, and the cone subtending a vertex in the range of 15 to 20 degrees. The fuselage nose possesses an X-axis length to Z axis base diameter ratio in the range of 2 to 3. The aircraft further includes a single main wing secured on top of the upper fuselage in which the XY plane of the wing is in alignment with the line of thrust of the aft-located prop. The aircraft also includes a tail fin system itself having three separate tailfins, one of the fins directed downwardly in the negative Z direction and perpendicularly to the plane of the fixed wing. The second and third tail fins of the tail fin system are disposed respectively symmetrically about the XZ plane of the aircraft, each of those fins disposed at an angle, relative to the plane of the fixed wing, in the range of 30 to 60 degrees.

6 Claims, 2 Drawing Sheets

AIRCRAFT FUSELAGE

REFERENCE TO RELATED APPLICATION

This case is a Continuation-in-Part of Application Serial No. 06/948,197 filed Dec. 31, 1986, now abandoned.

BACKGROUND OF THE INVENTION

This invention relates to an efficient, safe, esthetic looking multiplepassenger aircraft having a very high flight distance to weight ratio.

As the aircraft industry has developed, a major emphasis has been placed upon speed, increased range, and specialized applications and usages of aircraft. Viewed in this context, the present inventive aircraft is intended to fill a need in civil aviation for a private aircraft having greater range than the prior art single or double engine aircraft such as Pipers, Cessnas, and Apaches on the one hand, and transcontinental type aircraft such as Gulfstreams and the like on the other hand.

More particularly, the prior art, as best known to the inventor, is exemplified by the following aircraft: the Piper Malibu, the Augusta-Siai, Marchetti SF.260TP, the Augusta-Caproni C22J Ventura, the Omac Laser 300, the AVTEK 400, the Gates-Piaggio Avanti, and the Beech Starship. illustrations and specifications of the above aircraft appear in the publication entitled "Flying--1986 Buyer's Guide" published by CBS Magazine, 1 Park Avenue, New York, New York 10016.

The need for an aircraft of the below set forth type has crystallized as a result of recent developments in high horse-power turbo prop engines. In other words, the present inventive aircraft design is adapted to take advantage of such recent developments in turbo prop technology.

In terms of distance to range-to-weight ratio, the instant aircraft improves upon both prior art propeller aircraft such as the Beach Bonanza B-35 and prior art private jets such as the Lear fan jet.

Related relevant prior art known to the Inventor consists of U.S. Pat. No. 2,424,889 to Holmes; U.S. Pat. No. 3,455,523 to Hertel; and No. 3,191,888 to Sklenka. Said art, however, combined, does not teach the structure and attendant functional advantages of the invention herein.

SUMMARY OF THE INVENTION

The invention relates to an aircraft having an X-axis in alignment with the line of thrust of the aircraft, a Y-axis transverse to said X-axis, the Y-axis in parallel with the length of a single main wing, and a Z-axis transverse to a plane defined by said X and Y axes. Included is a fuselage having Y-axis symmetry about said thrust line and substantially having X-axis symmetry about a line defined by the forward edge of said main wing. Further, said fuselage assembly has a substantially conical nose, said nose having its root at the beginning of the pilot's cabin, said nose subtending a vertex in the range of about 15 to 25 degrees, and having an X-axis length to Z-axis base diameter ratio in the range of about two to three, the bottom profile of said fuselage assembly arcing downward from the prop of the aircraft to the middle of the pilot's cabin and, thereafter, arcing upward away from the pilot's cabin to the tip of the nose of the aircraft. A single prop is located at the extreme aft end of said fuselage, said prop generating the thrust of the aircraft. A single main wing is secured on top of the upper fuselage and the XY plane of said wing is in alignment with the line of thrust of said aft-located prop. A tailfin system comprises three separate tailfins, a first of said fins directed downwardly in the negative Z direction and perpendicularly to the plane of said fixed wing, and second and third tailfins directed upwardly and disposed respectively symmetrically about the X Z plane of the aircraft, each of said second and third fins disposed at an angle, relative to the plane of said fixed wing, in the range of 30 to 60 degrees, each of said second and third fins having about twice the length of said first fin, said prop of the aircraft located aft of said tailfin system.

It is an object of the present invention to provide an enhanced net weight to range ratio and, more particularly, a net weight-to-range ratio of at least one pound net weight to one mile of range.

It is another object to provide an aerodynamic design particularly adapted to make use of a state of the art high horsepower turbo prop engines.

It is a further object to provide an aircraft of the above set forth type which employs modular sectional bulkheads in order to achieve advantages of construction, repair, and safety.

It is a yet further object to provide an aircraft having the above advantages, which, as well, is particularly esthetic in its appearance.

The above and yet other objects and advantages of the present invention will become apparent from the hereinafter set forth detailed description of the invention, drawings, and claims appended herewith.

DETAILED DESCRIPTION OF THE INVENTION

Figure 1:
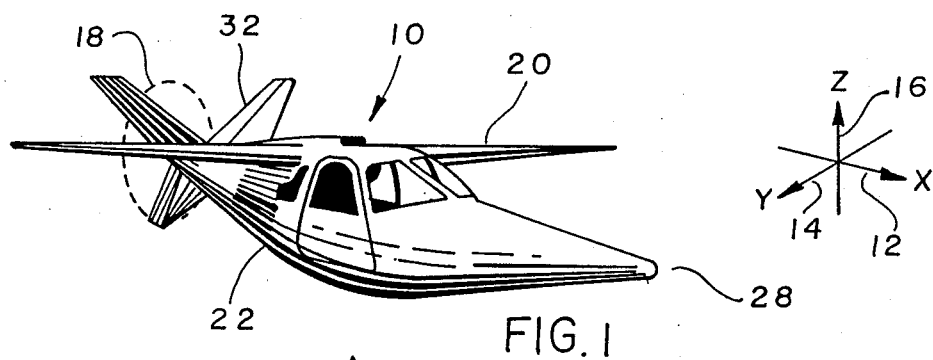
FIG. 1 is a front perspective view of the inventive aircraft.

With reference to FIG. 1 there is shown the generalized configuration of the inventive single aft located prop type aircraft 10.

In connection therewith is set forth an X, Y and Z Cartesian coordinate axis which will be of particular value in describing the directionality of the elements of the aircraft 10. In FIG. 1 said X axis is also denoted as direction 12, said Y axis as direction 14, and said Z axis as direction 16.

Figure 2:
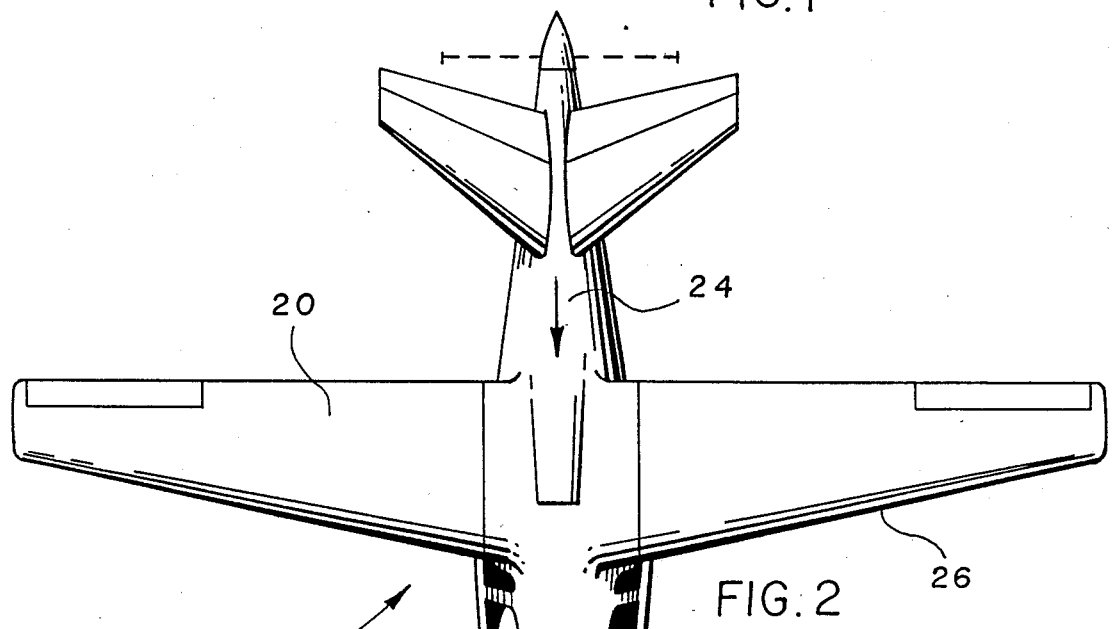
FIG. 2 is a top perspective view of the aircraft.
Figure 3:
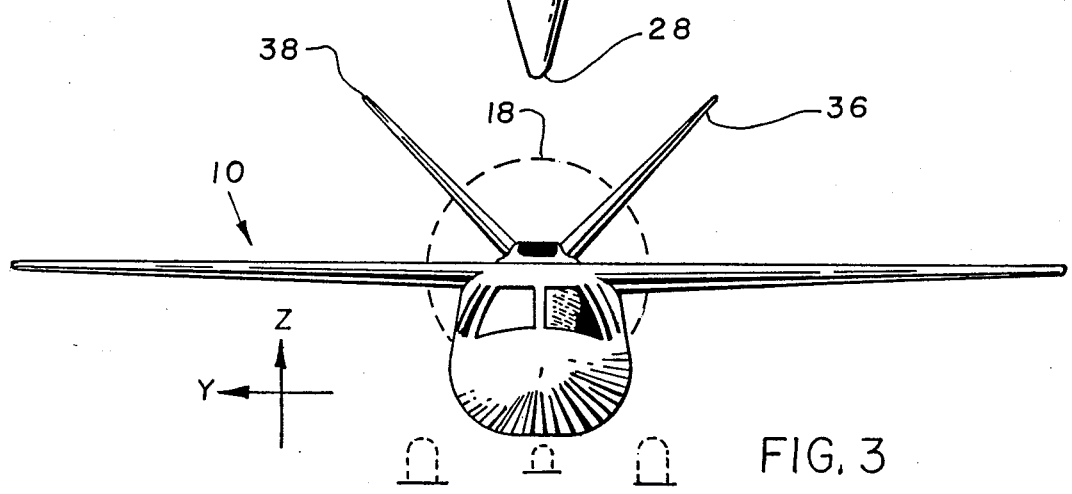
FIG. 3 is a front view thereof.

With reference to FIGS. 1 thru 3, it is to be noted that the inventive aircraft includes an aft located prop 18, a fixed main wing 20 and a fuselage 22. The fixed main wing is disposed at the top of the fuselage and the forward edge 26 thereof begins immediately beyond a pilot's cabin 30.

Figure 4:
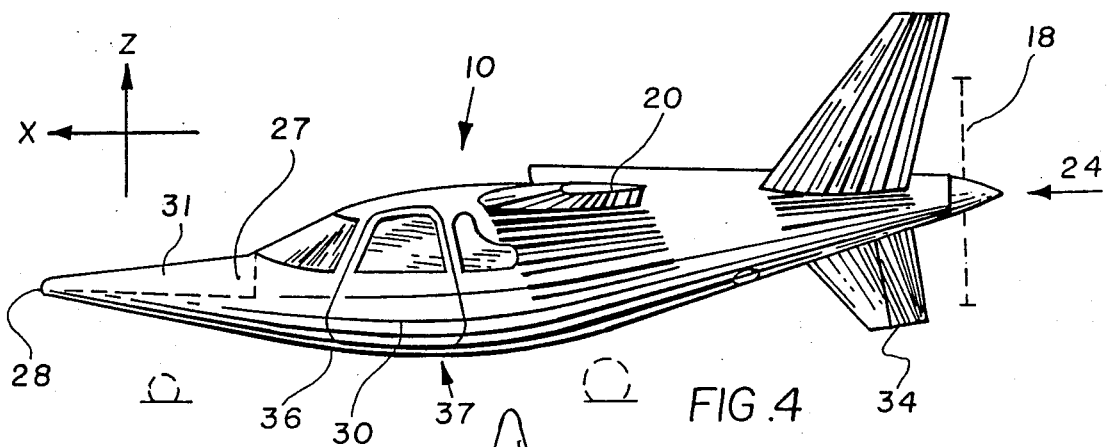
FIG. 4 is a side perspective view of the aircraft.
Figure 6:
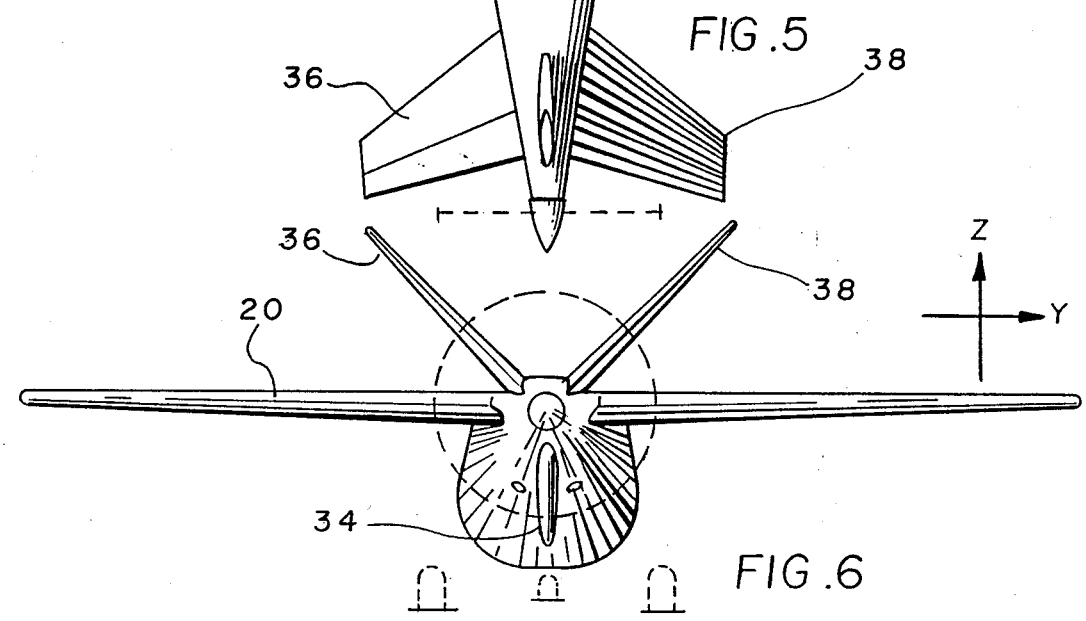
FIG. 6 is a rear perspective view.

With reference to FIGS. 2 and 4, it may be noted that aft located prop 18 generates a thrust line 24 which is in precise alignment with the positive X axis 12. The engine, it is noted, is located midship of the aircraft. Further, with reference to FIGS. 3, 4 and 6, it is to be noted that the fixed wing 20 is in the XY axis and, particularly, is in an X axis directionality which is precisely aligned with said thrust line 24.

Figure 5:
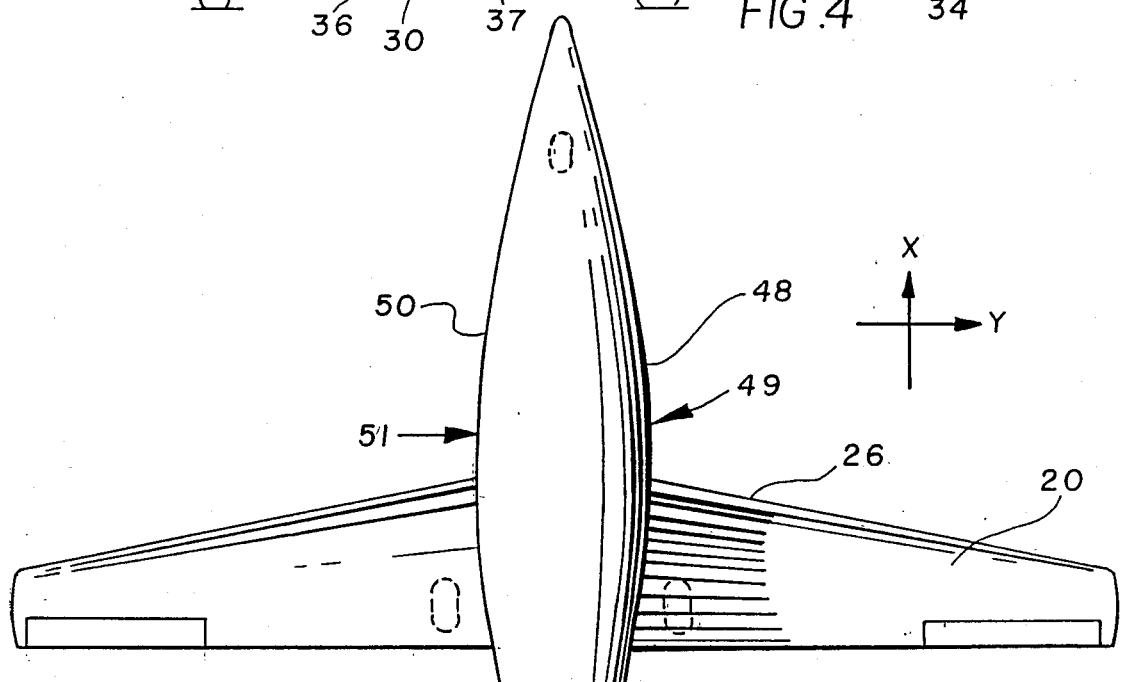
FIG. 5 is a bottom view thereof.

With reference to FIGS. 2 and 5 it may be noted that said fuselage 22 possesses an X axis symmetry about forward edge 26 of said main wing 20 and, in addition, possesses Y axis symmetry about said thrust line 24, this corresponding to X-axis 12.

The fuselage 22 (See FIG. 4) further includes a highly distinctive conical nose 28, said nose having an X axis height 31 and a Z axis root 27, said root beginning at the forwardmost portion of the pilot's cabin 30. In the preferred embodiment, the ratio of the height 31 of conical nose 28 to the root 27 thereof is in the range of 2 to 3. As a further distinguishing feature, said nose 28 subtends a vertex in the range of 15 to 20 degrees.

As a final defining feature of the present inventive aircraft, there is, forward of prop 18, provided a tailfin system 32 which comprises three separate tailfins 34, 36 and 38. More particularly, tailfin 34 projects directly downward in a negative Z direction, while tailfin 36 projects upward in the YZ plane in the negative Y direction, and tailfin 38 projects upward in the YZ plane in the positive Y direction. It should be noted that fins 36 and 38 are symmetric about the XZ plane and, further, are disposed at an angle relative to the plane of said fixed wing 30, which is in the range of 30 to 60 degrees.

In the preferred embodiment, the angulation of fins 36 and 38 above, to the plane of fixed wing 20, is about 30 degrees.

With reference to FIGS. 2 and 5, it may be noted that the ratio of the length of said fixed wing 20 to the entire Z axis length of the fuselage is approximately one to one.

With reference to FIG. 4, it may be noted that a bottom profile 36 of fuselage 22 arcs, with reference to the Z axis, downward from the prop 18 of the aircraft to a point 37 at the middle of the pilot's cabin and, thereafter, arcs upward in positive Z direction away from the pilot's cabin 30 and finally arrives at the tip of the nose 28 of the aircraft. Said bottom or lower profile 36 of the aircraft may be mathematically expressed by the equation $$Z = -0.43X + 0.017X^2.$$

With reference to FIG. 5, it is to be noted that the geometry of the fuselage is also defined by a lateral profile which is symmetric about the XZ plane. More particularly, first line 48 in the XY plane arcs outward from the prop area in the positive Y direction and, at point 49, changes its direction and direction of arc until reaching nose 28. This line may be mathematically defined by the equation $$Y = 0.35X - 0.007X^2.$$

Conversely, lateral profile line 50 begins at prop 18 arcing outward in the negative Y direction and, at point 51, changes its direction of arc, finally reaching nose 28. This line is an exact "mirror image" of line 48 and, as such, is defined by the equation $$Y = -0.35X + 0.007X^2.$$

While there have been shown and described the preferred embodiment of the present invention, it will be understood that the invention may be embodied otherwise than as herein specifically illustrated or described and that within said embodiments certain changes in the detail and construction, and the form of arrangement of the parts may be made without departing from the underlying idea or principles of this invention within the scope of the appended claims.

I claim:

1. An aircraft having an X-axis in alignment with the line of thrust of the aircraft, a Y-axis transverse to said X-axis, the Y-axis in parallel with the length of a single main wing, and a Z-axis transverse to a plane defined by said X and Y axes, the aircraft comprising:
  (a) a fuselage having Y-axis symmetry about said thrust line and substantially having X-axis symmetry about a line defined by the forward edge of said main wing;
  (b) said fuselage assembly further having a substantially conical nose, said nose having its root at the beginning of the pilot's cabin, said nose subtending a vertex in the range of about 15 to 25 degrees, and having an X-axis length to Z-axis base diameter ratio in the range of about two to three, the bottom profile of said fuselage assembly arcing downward from the prop of the aircraft to the middle of the pilot's cabin and, thereafter, arcing upward away from the pilot's cabin to the tip of the nose of the aircraft;
  (c) a single prop located at the extreme aft end of said fuselage, said prop generating the thrust of the aircraft;
  (d) said single main wing secured on top of the upper fuselage, the XY plane of said wing in alignment with the line of thrust of said aft-located prop; and
  (e) a tailfin system comprising three separate tailfins, a first of said fins directed downwardly in the negative Z direction and perpendicularly to the plane of said fixed wing; and second and third tailfins directed upwardly and disposed respectively symmetrically about the XZ plane of the aircraft, each of said second and third fins disposed at an angle, relative to the plane of said fixed wing, in the range of 30 to 60 degrees, each of said second and third fins having about twice the length of said first fin, said prop of the aircraft located aft of said tailfin system.

2. The prop aircraft as recited in claim 1 in which the thrust line of said prop is in a direction co-parallel with the negative X axis.

3. The aircraft as recited in claim 1 in which said second and third tail fins are disposed about the XZ plane of the aircraft and relative to the plane of said fixed wing at an angle of 30 degrees.

4. The aircraft as recited in claim 2 in which the ratio of the length of said fixed wing to length of said fuselage is about one to one.

5. The aircraft as recited in claim 2 in which said lower profile of the fuselage transverse a line in the XZ plane defined by the equation:

$$Z = 0.43X + 0.017X^2.$$

6. The aircraft as recited in claim 4 in which the lateral profile of the fuselage in the XY plane is, on the positive Y side of the aircraft defined by the equation:

$$Y = 0.35X - 0.007X^2.$$

and on the negative Y side of the aircraft defined by the equation:

$$Y = -0.35X + 0.007X^2.$$

* * * * *